(12) United States Patent
Yang et al.

(10) Patent No.: US 10,803,831 B2
(45) Date of Patent: Oct. 13, 2020

(54) METHOD AND DEVICE FOR ADJUSTING PICTURE QUALITY OF DISPLAYER

(71) Applicant: SHENZHEN TCL NEW TECHNOLOGY CO., LTD, Shenzhen, Guangdong (CN)

(72) Inventors: Fujun Yang, Shenzhen (CN); Xiaodong Zhang, Shenzhen (CN)

(73) Assignee: SHENZHEN TCL NEW TECHNOLOGY CO., LTD, Shenzhen, Guangdong (CN)

( * ) Notice: Subject to any disclaimer, the term of this patent is extended or adjusted under 35 U.S.C. 154(b) by 0 days.

(21) Appl. No.: 16/461,980

(22) PCT Filed: Dec. 28, 2016

(86) PCT No.: PCT/CN2016/112599
§ 371 (c)(1),
(2) Date: May 17, 2019

(87) PCT Pub. No.: WO2018/090448
PCT Pub. Date: May 24, 2018

(65) Prior Publication Data
US 2019/0325846 A1 Oct. 24, 2019

(30) Foreign Application Priority Data
Nov. 17, 2016 (CN) .......................... 2016 1 1027556

(51) Int. Cl.
*G09G 5/10* (2006.01)
(52) U.S. Cl.
CPC ........... *G09G 5/10* (2013.01); *G09G 2310/08* (2013.01); *G09G 2320/0276* (2013.01); *G09G 2320/0673* (2013.01); *G09G 2320/08* (2013.01)

(58) Field of Classification Search
CPC ... G09G 2310/08; G09G 5/10; G09G 2320/08
See application file for complete search history.

(56) References Cited

U.S. PATENT DOCUMENTS

| 2007/0188525 A1 | 8/2007 | Yamanaka et al. |
| 2009/0213055 A1 | 8/2009 | Chung et al. |

(Continued)

FOREIGN PATENT DOCUMENTS

| CN | 101695112 A | 4/2010 |
| CN | 102098421 A | 6/2011 |

(Continued)

OTHER PUBLICATIONS

Chinese Office Action dated Jul. 4, 2018, Appln. No. 201611027556.5.

(Continued)

*Primary Examiner* — Grace Q Li
(74) *Attorney, Agent, or Firm* — Westbridge IP LLC

(57) ABSTRACT

The present disclosure discloses a method for adjusting picture quality of displayer, comprising: adjusting a core of a to-be-adjusted-displayer to make Gamma-value of the to-be-adjusted-displayer reach a target value under a preset gray scale, and taking the current Gamma-value of the core as $\gamma_n$ under the preset value; computing the value of $\gamma_n'$ corresponding to the to-be-adjusted-displayer by a preset algorithm based on the $\gamma_n$, the values of $\gamma_0$ and $\gamma_0'$ corresponding to a standard-PQ-displayer, which are under one same gray scale; and adjusting picture quality of the to-be-adjusted-displayer according to the $\gamma_n'$. The present disclosure also discloses a device for adjusting picture quality of displayer.

16 Claims, 10 Drawing Sheets

(56) References Cited

U.S. PATENT DOCUMENTS

| | | | |
|---|---|---|---|
| 2012/0120124 A1 | 5/2012 | Zhang | |
| 2014/0132494 A1 | 5/2014 | Kudo et al. | |
| 2015/0243198 A1 | 8/2015 | Zhang et al. | |
| 2017/0116956 A1* | 4/2017 | Yang | G01N 21/95 |
| 2018/0040295 A1* | 2/2018 | Deng | G09G 5/10 |

FOREIGN PATENT DOCUMENTS

| | | |
|---|---|---|
| CN | 102348126 A | 2/2012 |
| CN | 102930850 A | 2/2013 |
| CN | 104486609 A | 4/2015 |
| CN | 105096827 A | 11/2015 |
| CN | 105138185 A | 12/2015 |
| CN | 105244007 A | 1/2016 |
| WO | 2016/078103 A1 | 5/2016 |

OTHER PUBLICATIONS

International Search Report and Written Opinion dated Aug. 9, 2017; PCT/CN2016/112599.
Extended European Search Report dated Apr. 24, 2020; Appln. No. 16921920.1.

\* cited by examiner

METHOD AND DEVICE FOR ADJUSTING PICTURE QUALITY OF DISPLAYER

FIELD

The present disclosure relates to the technical field of displayers, in particular, relates to a method and a device for adjusting picture quality of displayers.

BACKGROUND

Picture quality (herein after PQ) of a television needs to be adjusted during design of the television. Since the adjustment of picture quality is delicate, it is common to obtain an adjusting data by performing the adjusting on one standard-PQ-displayer first, and then to apply the obtained data to other displayers of same model which are produced in the same batch.

However, for any batch of electronic products, product performance deviation or dispersion among individuals are inevitably existed. Even if two products are of one same model and batch, the performance of the two products are not assuredly the same. Such issue also exists in Thin Film Transistor Liquid Crystal displayer television or other displayer devices. Due to factors such as manufacturing accuracy and quality control, individuals of one batch are usually different in brightness and color. For instance, among the displayers of one same model which are produced in the same batch, the maximum brightness difference reaches nearly 20%, and the Gamma-value ranges from 1.8 to 2.5. The difference between Gamma-value-values under different gray scales is even larger for one same displayer. These differences have directly affected the picture quality of the displayers, such as brightness, and level of contrast.

So, due to the individual differences between the standard-PQ-displayer and the to-be-adjusted-displayer, applying the adjusting data of the standard-PQ-displayer to the to-be-adjusted-displayers may seriously affect the picture quality of the displayers that finally obtain. The picture quality finally obtained may deviate from or even be antipodal to what is initially desired.

Currently, in order to make the mass-produced products achieve the picture quality as a standard-PQ-displayer as desired at the beginning of design, it is common to strictly control components in consistency so as to reduce the performance difference among the mass-produced individuals. However, in practice, it is still difficult to assure the picture quality of the mass-produced products to be as good as the picture quality of a standard-PQ-displayer.

The above content is only used to assist in understanding the technical schemes of the present disclosure, and does not mean to admit that the above content is the prior art.

SUMMARY

The main purpose of the present disclosure is to provide a method and a device for adjusting picture quality of displayer, to solve the problem that the picture quality of mass-produced products is not as good as the picture quality of a standard-PQ-displayer, even though by controlling components in consistency of the mass-produced products.

In order to achieve the above object, the present disclosure provides a method for adjusting picture quality of displayer, which includes the following steps:

adjusting a core of a to-be-adjusted-displayer to make Gamma-value ($\gamma$) value of the to-be-adjusted-displayer reach a target value under a preset gray scale, and taking the current Gamma-value of the core as the value of $\gamma_n$ under the preset value;

computing the value of $\gamma_n'$ corresponding to the to-be-adjusted-displayer by a preset algorithm based on the value of $\gamma_n$, the values of $\gamma_0$ and $\gamma_0'$ corresponding to a standard-PQ-displayer, which are under one same gray scale; and adjusting picture quality of the to-be-adjusted-displayer according to the value of $\gamma_n'$;

and, the value of $\gamma_0$ is Gamma-value of a core of the standard-PQ-displayer when Gamma-value of the standard-PQ-displayer reaches the target value, the value of $\gamma_0'$ is Gamma-value of the core of the standard-PQ-displayer when picture quality of the standard-PQ-displayer reaches a target, the value of $\gamma_n$ is Gamma-value of the core of the to-be-adjusted-displayer when Gamma-value of the to-be-adjusted-displayer reaches the target value, and the value of $\gamma_n'$ is Gamma-value of the core of the to-be-adjusted-displayer when the picture quality of the to-be-adjusted-displayer reaches the target.

Preferably, the method further includes:

acquiring a functional relationship between Gamma-value of the displayer and Gamma-value of the core, and a functional relationship between Gamma-value of the core of the standard-PQ-displayer and Gamma-value of the core of the to-be-adjusted-displayer; and acquiring the preset algorithm for computing the value of $\gamma_n'$ corresponding to the to-be-adjusted-displayer by operation on the functional relationships.

Preferably, the functional relationship between Gamma-value of the displayer and Gamma-value of the core is:

Gamma-value of the displayer including Gamma-value of the core and Gamma-value of a Timer Control Register, the functional relationship between Gamma-value of the displayer and, Gamma-value of the core and Gamma-value of the Timer Control Register being presented as follows:

$n\hat{\,}(\gamma_0 \cdot \gamma_{T0}) = n\hat{\,}a$, for the standard-PQ-displayer, when Gamma-value of the displayer is the target value a; and $n\hat{\,}(\gamma_n \cdot \gamma_{Tn}) = n\hat{\,}a$, for the to-be-adjusted-displayer, when Gamma-value of the displayer is the target value a; and, Gamma-value of the Timer Control Register being determined by a screen driving plate and is a fixed value; the value of $\gamma_{T0}$ is Gamma-value of the Timer Control Register of the standard-PQ display; the value of $\gamma_{Tn}$ is Gamma-value of the Timer Control Register of the to-be-adjusted-displayer.

Preferably, the preset algorithm is $\gamma_n' = \gamma_0' \cdot \gamma_n / \gamma_0$.

Preferably, before the operation of adjusting a core of a to-be-adjusted-displayer to make Gamma-value of the to-be-adjusted-displayer reach a target value under a preset gray scale, and taking the current Gamma-value of the core as the value of $\gamma_n$ under the preset value, the method further includes:

adjusting the core to make Gamma-value of the standard-PQ-displayer reach the target value under the preset gray scale, and taking the current Gamma-value of the core as the value of $\gamma_0$ under the preset value;

adjusting the core to make picture quality of the standard-PQ-displayer reach the target under the preset gray scale, and taking the current Gamma-value of the core as the value of $\gamma_0'$ under the preset value;

inputting the values of $\gamma_0$ and $\gamma_n'$ corresponding to the standard-PQ-displayer into the to-be-adjusted-displayer.

Preferably, the method further includes:

setting the target value of Gamma-value of the displayer corresponding to the preset gray scale according to gray level.

Preferably, the operation of setting the target value of Gamma-value of the displayer corresponding to the preset gray scale according to gray level includes:

setting the target value of Gamma-value of the displayer corresponding to a gray scale of a lower gray level greater than or equal to the target value of Gamma-value of the displayer corresponding to a gray scale of a higher gray level.

Preferably, the method further includes:

sending a warning message, when the value of $\gamma_n'$ is not obtained by adjusting the core.

In addition, in order to achieve the above object, the present disclosure also provides a device for adjusting picture quality of displayer, which includes:

an adjusting module, configured to adjust a core of a to-be-adjusted-displayer to make Gamma-value of the to-be-adjusted-displayer reach a target value under a preset gray scale, and taking the current Gamma-value of the core as the value of $\gamma_n$ under the preset value; and a computing module, configured to compute the value of $\gamma_n'$ corresponding to the to-be-adjusted-displayer by a preset algorithm based on the value of $\gamma_n$, the values of $\gamma_0$ and $\gamma_0'$ corresponding to a standard-PQ-displayer, which are under one same gray scale;

the adjusting module being further configured to adjust picture quality of the to-be-adjusted-displayer according to the value of $\gamma_n'$;

and the value of $\gamma_0$ is Gamma-value of a core of the standard-PQ-displayer when Gamma-value of the standard-PQ-displayer reaches the target value, the value of $\gamma_0'$ is Gamma-value of the core of the standard-PQ-displayer when picture quality of the standard-PQ-displayer reaches a target, the value of $\gamma_n$ is Gamma-value of the core of the to-be-adjusted-displayer when Gamma-value of the to-be-adjusted-displayer reaches the target value, and the value of $\gamma_n'$ is Gamma-value of the core of the to-be-adjusted-displayer when the picture quality of the to-be-adjusted-displayer reaches the target.

Preferably, the device for adjusting picture quality of displayer further includes:

an acquiring module, configured to acquire a functional relationship between Gamma-value of the displayer and Gamma-value of the core, and a functional relationship between Gamma-value of the core of the standard-PQ-displayer and Gamma-value of the core of the to-be-adjusted display; and an algorithm module, configured to acquire the preset algorithm for computing the value of $\gamma_n'$ corresponding to the to-be-adjusted-displayer by operation on the functional relationships.

Preferably, the functional relationship between Gamma-value of the displayer and Gamma-value of the core is:

Gamma-value of the displayer including Gamma-value of the core and Gamma-value of a Timer Control Register, the functional relationship between Gamma-value of the displayer and, Gamma-value of the core and Gamma-value of the Timer Control Register being represented as follows:

$n\hat{}(\gamma_n \cdot \gamma_{T0}) = n\hat{}a$, for the standard-PQ-displayer, when Gamma-value of the displayer is the target value a; and $n\hat{}(\gamma_n \cdot \gamma_{Tn}) = n\hat{}a$, for the to-be-adjusted-displayer, when Gamma-value of the displayer is the target value a; and, Gamma-value of the Timer Control Register being determined by a screen driving plate and is a fixed value; the value of $\gamma_{T0}$ is Gamma-value of the Timer Control Register of the standard-PQ display; the value of $\gamma_{Tn}$ is Gamma-value of the Timer Control Register of the to-be-adjusted-displayer.

Preferably, the preset algorithm is $\gamma_n' = \gamma_0' \cdot \gamma_n / \gamma_0$.

Preferably, the device for adjusting picture quality of displayer further includes an inputting module;

the adjusting module is further configured to adjust the core to make Gamma-value of the standard-PQ-displayer reach the target value under the preset gray scale, and to take the corresponding Gamma-value of the core as the value of $\gamma_0$ under the preset value; and adjusting the core to make picture quality of the standard-PQ-displayer reach the target under the preset gray scale, and taking the current Gamma-value of the core as the value of $\gamma_0'$ under the preset value;

the inputting module is configured to input the values of $\gamma_0$ and $\gamma_0'$ corresponding to the standard-PQ-displayer into the to-be-adjusted-displayer.

Preferably, the device for adjusting picture quality of displayer further includes:

a target value setting module, configured to set the target value of Gamma-value of the displayer corresponding to the preset gray scale according to gray level.

Preferably, the target value setting module is also configured to set the target value of Gamma-value of the displayer corresponding to a gray scale of a lower gray level greater than or equal to the target value of Gamma-value of the displayer corresponding to a gray scale of a higher gray level.

Preferably, the device for adjusting picture quality of displayer further includes:

a warning module, configured to send a warning message, when the value of $\gamma_n'$ is not obtained by adjusting the core.

According to the present disclosure, a core of a to-be-adjusted-displayer is adjusted to make Gamma-value of the to-be-adjusted-displayer reach a target value under a preset gray scale, and the corresponding Gamma-value of the core is taken as the value of $\gamma_n$ under the preset value; the value of $\gamma_n'$ corresponding to the to-be-adjusted-displayer is computed by a preset algorithm based on the value of $\gamma_n$, the values of $\gamma_0$ and $\gamma_0'$ corresponding to a standard-PQ-displayer, which are under one same gray scale; and picture quality of the to-be-adjusted-displayer is adjusted according to the value of $\gamma_n'$; and, the value of $\gamma_0$ is Gamma-value of a core of the standard-PQ-displayer when Gamma-value of the standard-PQ-displayer reaches the target value, the value of $\gamma_0'$ is Gamma-value of the core of the standard-PQ-displayer when picture quality of the standard-PQ-displayer reaches a target, the value of $\gamma_n$ is Gamma-value of the core of the to-be-adjusted-displayer when Gamma-value of the to-be-adjusted-displayer reaches the target value, and the value of $\gamma_n'$ is Gamma-value of the core of the to-be-adjusted-displayer when the picture quality of the to-be-adjusted-displayer reaches the target. It is realized that the value of $\gamma_n'$ corresponding to each to-be-adjusted-displayer corresponds to the components of the displayer, by computing the value of $\gamma_n'$ and adjusting cores of the to-be-adjusted-displayers. The value of $\gamma_n'$ is different when the component is different, thereby whether the components are in consistency has nothing to do with the adjustment of picture quality of the to-be-adjusted-displayers.

The realization, functional characteristics and advantages of the object of the present disclosure will be further explained with reference to the attached drawings in combination with embodiments.

DETAILED DESCRIPTION OF THE EMBODIMENTS

It should be understood that the specific embodiments described herein are only for the purpose of explaining the present disclosure and are not intended to limit the present disclosure.

The present disclosure provides a method for adjusting picture quality of a displayer.

Figure 1:
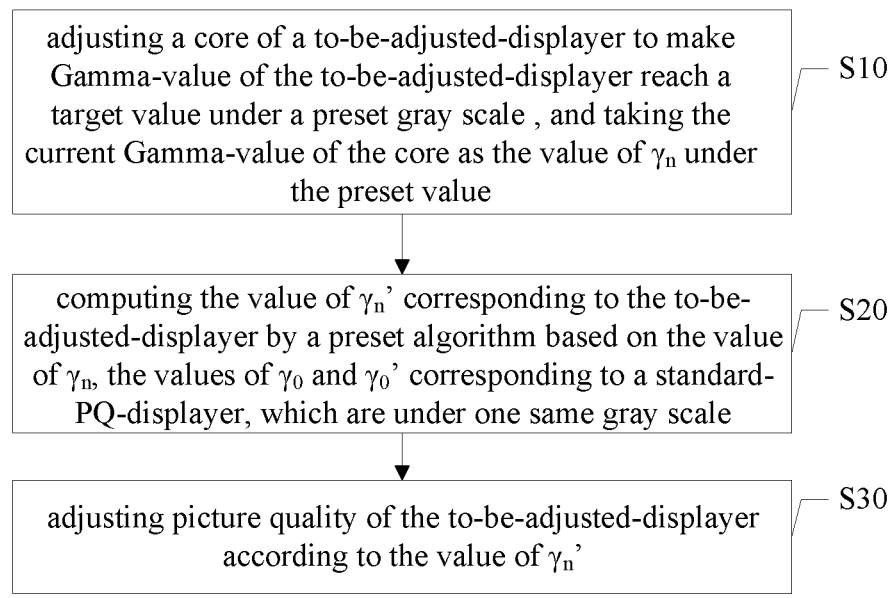
FIG. 1 is a flow chart of a first embodiment of the method for adjusting picture quality of displayer according to the present disclosure.

Referring to FIG. 1, FIG. 1 is a flow chart of a first embodiment of the method for adjusting picture quality of displayer according to the present disclosure.

In one embodiment, the method for adjusting picture quality of displayer includes:

Step S10, adjusting a core of a to-be-adjusted-displayer to make Gamma-value of the to-be-adjusted-displayer reach a target value under a preset gray scale, and taking the current Gamma-value of the core as the value of $\gamma_n$ under the preset value.

For displayers, in order to make all picture quality of displayers the same, it is necessary to strictly control components of the displayers in consistency so as to reduce performance difference between the mass-produced displayers, and to adjust the to-be-adjusted-displayers according to a standard-PQ-displayer as standard so as to make all the picture quality of the to-be-adjusted-displayers reach or approximately reach the picture quality of the standard-PQ-displayer. When Gamma-value of a displayer reaches a value that makes the best picture quality, the picture quality of the displayer would have been adjusted to the target picture quality. Gamma-value of the displayer includes Gamma-value of the core and Gamma-value of the Timer Controller Register (TCON) of the displayer. And since Gamma-value of TCON is determined by properties of the screen driving plate, that is, Gamma-value of TCON of the displayer is fixed, adjusting picture quality is actually to adjust Gamma-value of the core. Generally speaking, adjusting picture quality is to adjust different gray scales. Because there commonly divided with 256 different gray scales, Gamma-values of a displayer don't have to be the same when the displayer reaches one target picture quality under different gray scales, that is, Gamma-values of the core don't have to be the same. As it is convenient to measure Gamma-value of a displayer, and same picture quality corresponds to same Gamma-value of the displayers, a to-be-adjusted-displayer differs only in Gamma-value of the core in comparison with the standard-PQ-displayer when the to-be-adjusted-displayer reaches the same picture quality with that of the standard-PQ-displayer. And Gamma-value of the core of the standard-PQ-displayer is known when the adjustment is finished, Gamma-value of TCON may be presented in relationship with Gamma-value of the core and/or Gamma-value of the displayer, which means the only one unknown is Gamma-value of the core of the to-be-adjusted display; adjust a core of a to-be-adjusted-displayer to make Gamma-value of the to-be-adjusted-displayer reach a target value under a preset gray scale, and take the corresponding Gamma-value of the core as the value of $\gamma_n$ under the preset value; thereby, excluding the effect caused by inconvenient measurement of Gamma-value of TCON.

Step S20, computing the value of $\gamma_n'$ corresponding to the to-be-adjusted-displayer by a preset algorithm based on the value of $\gamma_n$, the values of $\gamma_0$ and $\gamma_0'$ corresponding to a standard-PQ-displayer, which are under one same gray scale.

As mentioned above, as only Gamma-value of the core of the to-be-adjusted-displayer is unknown, and Gamma-value of the displayer includes Gamma-value of the core and Gamma-value of the TCON, a preset algorithm may be obtained through mathematical operation according to the relationship between Gamma-value of the to-be-adjusted-displayer, Gamma-value of the standard-PQ-displayer, Gamma-value of the cores and the TCONs of the to-be-adjusted-displayer and the standard-PQ-displayer. That is, Gamma-value of the core of the to-be-adjusted-displayer is presented by Gamma-value of the to-be-adjusted-displayer and Gamma-value of the TCON of the to-be-adjusted-displayer, and Gamma-value of the to-be-adjusted-displayer and Gamma-value of the TCON of the to-be-adjusted-displayer may be presented by Gamma-value of the standard-PQ-displayer and Gamma-value of the core of the standard-PQ-displayer. It means that to present Gamma-value of the core of the to-be-adjusted-displayer by Gamma-value of the standard-PQ-displayer and Gamma-value of the core of the standard-PQ-displayer (the preset algorithm), and Gamma-value of the core of the standard-PQ-displayer is known ($\gamma_0$, $\gamma_0'$), the value of $\gamma_n$ of the to-be-adjusted-displayer may also be obtained by adjustment, therefore the value of $\gamma_n'$ corresponding to the to-be-adjusted-displayer may be computed according to the preset algorithm and, the value of $\gamma_0$ is Gamma-value of a core of the standard-PQ-displayer when Gamma-value of the standard-PQ-displayer reaches the target value, the value of $\gamma_0'$ is Gamma-value of the core of the standard-PQ-displayer when picture quality of the standard-PQ-displayer reaches a target, the value of $\gamma_n$ is Gamma-value of the core of the to-be-adjusted-displayer when Gamma-value of the to-be-adjusted-displayer reaches the target value, and the value of $\gamma_n'$ is Gamma-value of the core of the to-be-adjusted-displayer when the picture quality of the to-be-adjusted-displayer reaches the target.

Step S30, adjusting picture quality of the to-be-adjusted-displayer according to the value of $\gamma_n'$;

and, the value of $\gamma_0$ is Gamma-value of a core of the standard-PQ-displayer when Gamma-value of the standard-PQ-displayer reaches the target value, the value of $\gamma_0'$ is Gamma-value of the core of the standard-PQ-displayer when picture quality of the standard-PQ-displayer reaches a target, the value of $\gamma_n$ is Gamma-value of the core of the to-be-adjusted-displayer when Gamma-value of the to-be-adjusted-displayer reaches the target value, and the value of $\gamma_n{}'$ is Gamma-value of the core of the to-be-adjusted-displayer when the picture quality of the to-be-adjusted-displayer reaches the target.

The core of the to-be-adjusted-displayer is adjusted to make Gamma-value of the core be the value of $\gamma_n{}'$ under the gray scale, so as to realize the adjustment of the picture quality. In this case, Gamma-value of the to-be-adjusted-displayer is the same as that of the standard-PQ-displayer, that is, the picture quality of the to-be-adjusted-displayer is the same as that of the standard-PQ-displayer. Traditional picture quality adjustment method is to directly copy Gamma-value of the core of the standard-PQ-displayer to the to-be-adjusted-displayer. When Gamma-value of the TCON of the standard-PQ-displayer is different from that of the to-be-adjusted-displayer, i.e., when there is performance difference between individual products, Gamma-value of the to-be-adjusted-displayer will be different from that of the standard-PQ-displayer, i.e. the picture quality of the two displayers is different. The picture quality of the displayers is adjusted by adaptively computing all Gamma-value of the cores of to-be-adjusted-displayers, so that each to-be-adjusted-displayer may have the same picture quality with that of the standard-PQ-displayer regardless of whether the components of the displayers are in consistency, which is simple and efficient.

According to the present embodiment, the picture quality of the displayers is adjusted by adaptively computing all Gamma-value of the core of to-be-adjusted-displayers, so that each to-be-adjusted-displayer may have the same picture quality with that of the standard-PQ-displayer regardless of whether the components of the displayers are in consistency, which is simple and efficient.

Figure 2:
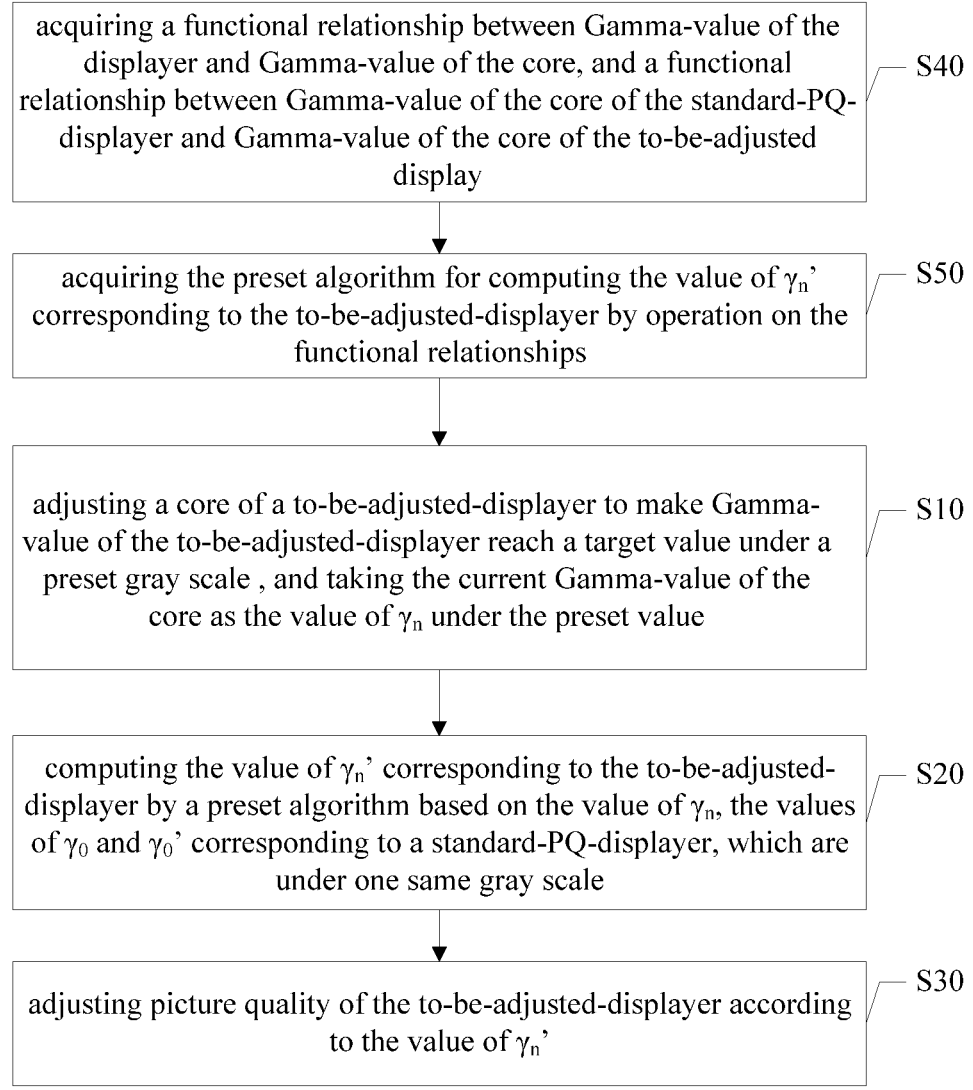
FIG. 2 is a flow chart of a second embodiment of the method for adjusting picture quality of displayer according to the present disclosure.

Referring to FIG. 2, FIG. 2 is a flow chart of a second embodiment of the method for adjusting picture quality of displayer according to the present disclosure; According to the first embodiment of the method for adjusting picture quality of displayer, the method also includes:

Step S40, acquiring a functional relationship between Gamma-value of the displayer and Gamma-value of the core, and a functional relationship between Gamma-value of the core of the standard-PQ-displayer and Gamma-value of the core of the to-be-adjusted display; and Step S50, acquiring the preset algorithm for computing the value of $\gamma_n{}'$ corresponding to the to-be-adjusted-displayer by operation on the functional relationships.

A functional relationship between Gamma-value of the displayer and Gamma-value of the core, and a functional relationship between Gamma-value of the core of the standard-PQ-displayer and Gamma-value of the core of the to-be-adjusted display are acquired; and the preset algorithm for computing the value of $\gamma_n{}'$ corresponding to the to-be-adjusted-displayer is acquired by operation on the functional relationships. In one embodiment, the computing process according to the preset algorithm is as follows, in which the target value of Gamma-value of the displayer is taken as 2.2 as an example for description. Of course, Gamma-value of the displayer may also be any other values; under the gray scale n, Gamma-value of the TCON of the standard-PQ-displayer is recorded as the value of $\gamma_{T0}$, Gamma-value of the core is recorded as the value of $\gamma_0$ when Gamma-value of the displayer is 2.2, and when Gamma-value of the core is the value of $\gamma_0$, the standard-PQ-displayer has the target picture quality, and Gamma-value of the displayer is a; record Gamma-value of the TCON of the to-be-adjusted-displayer as the value of $\gamma_{Tn}$, and when Gamma-value of the displayer reaches 2.2, Gamma-value of its core is the value of $\gamma_n$. When Gamma-value of the to-be-adjusted-displayer is also a, the to-be-adjusted-displayer has the target picture quality same with that of the standard-PQ-displayer, and the corresponding Gamma-value of the core is the value of $\gamma_n{}'$; the functional relationship between Gamma-value of the displayer and Gamma-value of the core and the TCON is represented as follows:

$$n\char`\^(\gamma_0{}'\cdot\gamma_{T0})=n\char`\^a \tag{1}$$

$$n\char`\^(\gamma_0\cdot\gamma_{T0})=n\char`\^2.2 \tag{2}$$

$$n\char`\^(\gamma_n{}'\cdot\gamma_{Tn})=n\char`\^a \tag{3}$$

$$n\char`\^(\gamma_n\cdot\gamma_{Tn})=n\char`\^2.2 \tag{4}$$

From the above equations (1) and (3), (2) and (4), it may be obtained as follows:

$$n\char`\^(\gamma_0{}'\cdot\gamma_{T0})=\char`\^(\gamma_n{}'\cdot\gamma_{Tn}) \tag{5}$$

$$n\char`\^(\gamma_0\cdot\gamma_{T0})=n\char`\^(\gamma_n\cdot\gamma_{Tn}) \tag{6}$$

That is, $$\gamma_0{}'\cdot\gamma_{T0}=\gamma_n{}'\cdot\gamma_{Tn} \tag{7}$$

$$\gamma_0\cdot\gamma_{T0}=\gamma_n\cdot\gamma_{Tn} \tag{8}$$

From equations (7) and (8), it may be obtained as follows:

$$\gamma_0{}'/\gamma_0=\gamma_n{}'/\gamma_n \tag{9}$$

That is, $$\gamma_n{}'=\gamma_0{}'\cdot\gamma_n/\gamma_0 \tag{10}$$

The above formula (10) is the preset algorithm. It may be known from the formula (10) that as long as the values of $\gamma_0$ and $\gamma_0{}'$ corresponding to the standard-PQ-displayer, and the value of $\gamma_n$ of the to-be-adjusted-displayer, are determined, the value of $\gamma_n{}'$ corresponding to the to-be-adjusted-displayer is determined. And the value of $\gamma_n{}'$ is right the Gamma-value of the core to be adjusted to for the picture quality same with that of the standard-PQ-displayer. It is simple to obtain the value of $\gamma_n{}'$ corresponding to the to-be-adjusted-displayer via the preset algorithm, which corresponds to Gamma-value of the core that makes the to-be-adjusted-displayer gain the same picture quality with that of the standard-PQ-displayer.

In this embodiment, the preset algorithm for computing the value of $\gamma_n{}'$ corresponding to the to-be-adjusted-displayer is obtained by the functional relationship between Gamma-value of displayer and Gamma-value of core, and the functional relationship between Gamma-value of the core of the standard-PQ-displayer and Gamma-value of the core of the to-be-adjusted-displayer. It is simple to obtain the value of $\gamma_n{}'$ corresponding to the to-be-adjusted-displayer via the preset algorithm, which corresponds to Gamma-value of the core that makes the to-be-adjusted-displayer gain the same picture quality with that of the standard-PQ-displayer.

Figure 3:
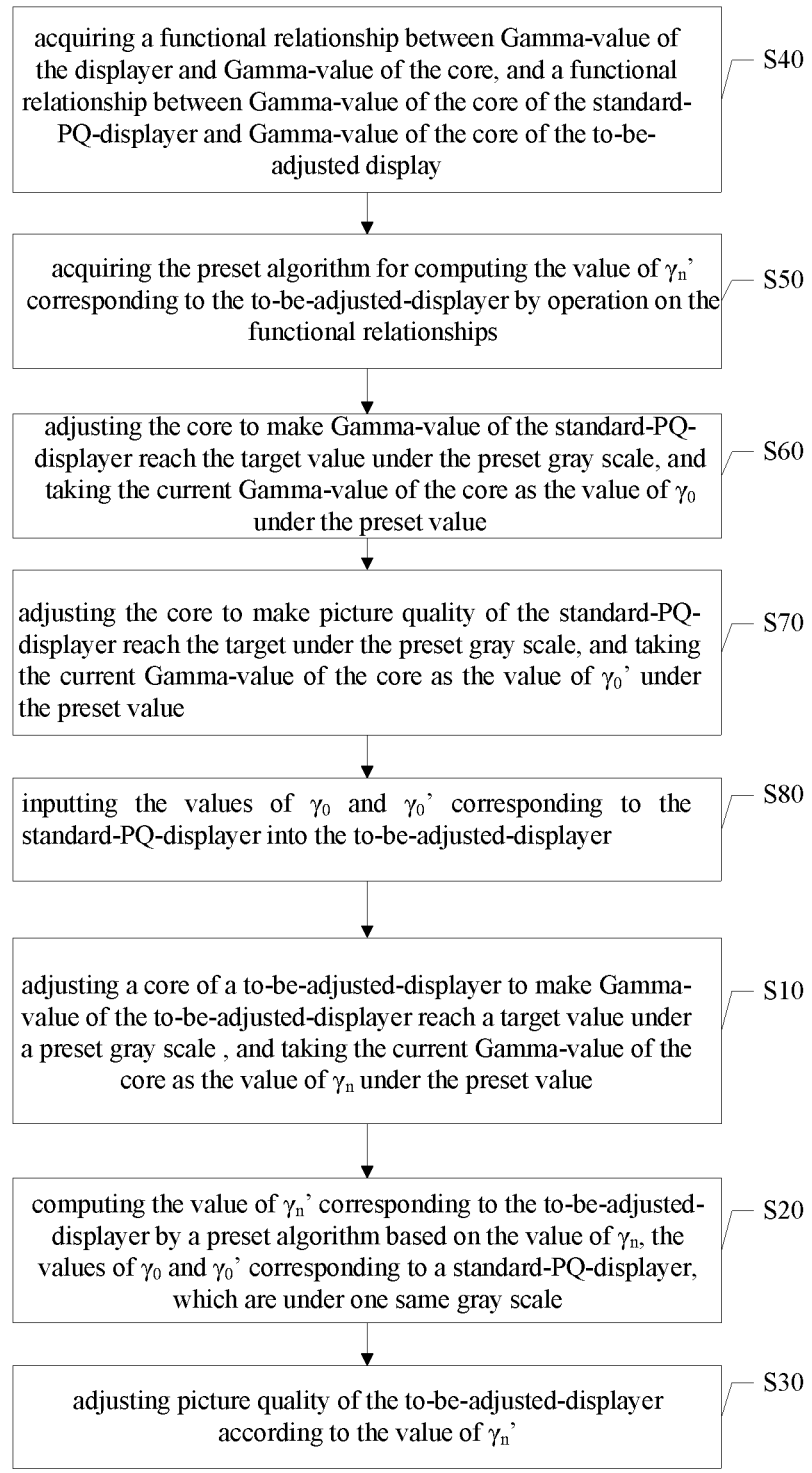
FIG. 3 is a flow chart of a third embodiment of the method for adjusting picture quality of displayer according to the present disclosure.

Referring to FIG. 3, FIG. 3 is a flow chart of a third embodiment of the method for adjusting picture quality of displayer according to the present disclosure; According to the second embodiment of the method for adjusting picture quality of displayer, before the operation S10, the method also includes:

S60, adjusting the core to make Gamma-value of the standard-PQ-displayer reach the target value under the preset gray scale, and taking the current Gamma-value of the core as the value of $\gamma_0$ under the preset value;

S70, adjusting the core to make picture quality of the standard-PQ-displayer reach the target under the preset gray scale, and taking the current Gamma-value of the core as the value of $\gamma_0'$ under the preset value;

S80, inputting the values of $\gamma_0$ and $\gamma_0'$ corresponding to the standard-PQ-displayer into the to-be-adjusted-displayer.

As mentioned above, to obtain the value of $\gamma_n'$ corresponding to the to-be-adjusted-displayer through the preset algorithm makes it necessary to know the values of $\gamma_0$ and $\gamma_0'$ corresponding to the standard-PQ-displayer, and the value of $\gamma_n$ of the to-be-adjusted-displayer, and the values of $\gamma_0$ and $\gamma_0'$ are obtained by adjusting the standard-PQ-displayer. adjust the core to make Gamma-value of the standard-PQ-displayer reach the target value under the preset gray scale, and taking the current Gamma-value of the core as the value of $\gamma_0$ under the preset value; adjust the core to make picture quality of the standard-PQ-displayer reach the target under the preset gray scale, and taking the current Gamma-value of the core as the value of $\gamma_0'$ under the preset value; Input the values of $\gamma_0$ and $\gamma_0'$ corresponding to the standard-PQ-displayer into the to-be-adjusted-displayer after the values of $\gamma_0$ and $\gamma_0'$ are obtained, then it is only necessary for obtaining the value of $\gamma_n'$ corresponding to the to-be-adjusted-displayer to adjust the to-be-adjusted-displayer so that Gamma-value of the to-be-adjusted-displayer reaches the target value; the values of $\gamma_0$ and $\gamma_0'$ corresponding to the standard-PQ-displayer may be inputted into the to-be-adjusted-displayers in one time, which are produced in one batch, so that picture quality adjustment may be carried out on the batch of the to-be-adjusted-displayers.

According to the embodiment, the values of $\gamma_0$ and $\gamma_0'$ corresponding to the standard-PQ-displayer may be obtained in advance, and then input the values of $\gamma_0$ and $\gamma_0'$ into the to-be-adjusted-displayers, so that the picture quality adjustment may be carried out on the batch of the to-be-adjusted-displayers.

Figure 4:
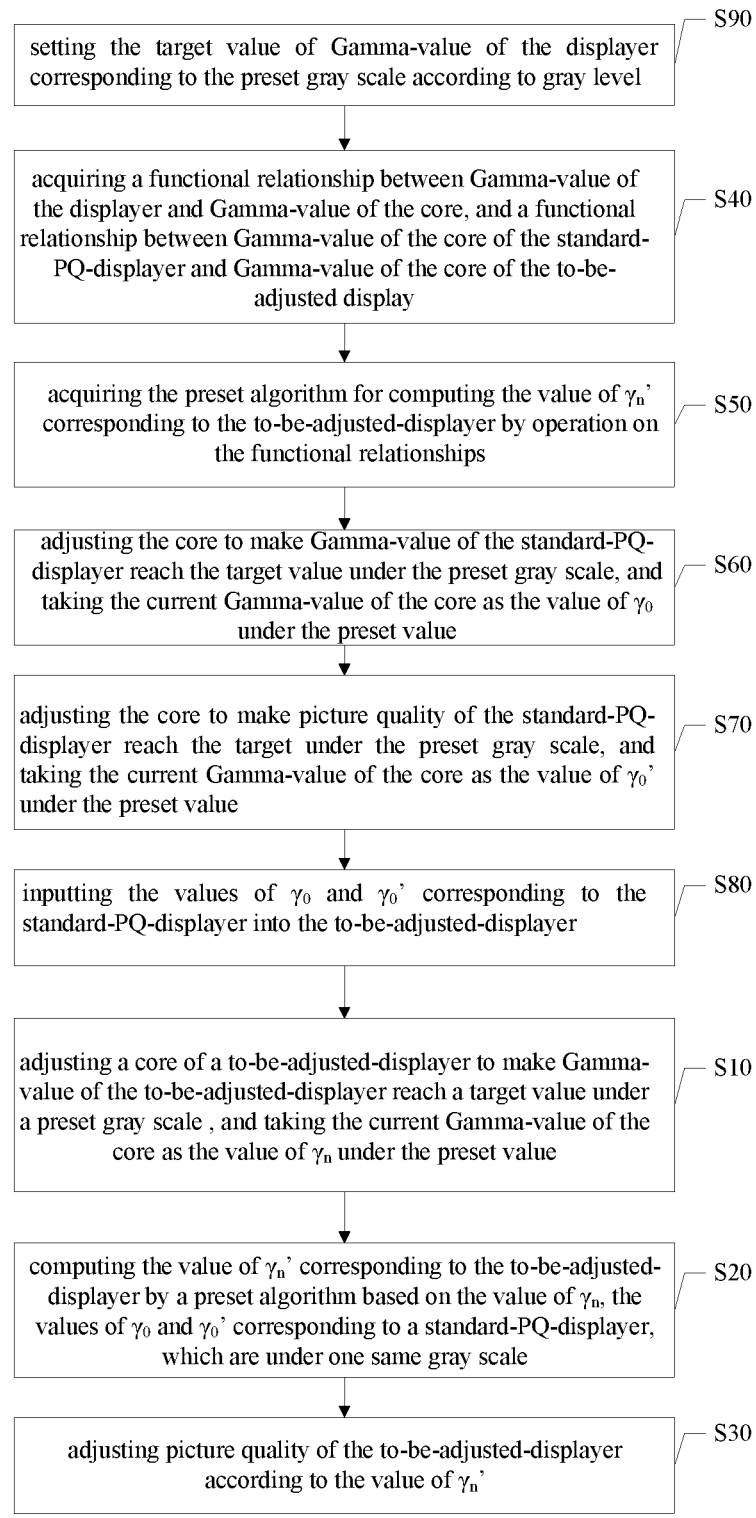
FIG. 4 is a flow chart of a fourth embodiment of the method for adjusting picture quality of displayer according to the present disclosure.

Referring to FIG. 4, FIG. 4 is a flow chart of a fourth embodiment of the method for adjusting picture quality of displayer according to the present disclosure; According to the third embodiment of the method for adjusting picture quality of displayer, the method also includes:

S90, setting the target value of Gamma-value of the displayer corresponding to the preset gray scale according to gray level.

The adjustment of picture quality is not only to adjust Gamma-value of the core, but also to adjust the color, etc. There are commonly divided with 256 gray levels ranging from 0 to 255, generally speaking, if the gray level is higher, the color displayed is richer, the picture is finer, and more details are shown. However, too low gray scale makes it necessary to increase Gamma-value of the displayer when to improve the contrast. For example, when the gray scale is high, Gamma-value of the displayer is set to 2.2, and when the gray scale is too low, Gamma-value of the displayer is adjusted to 2.4. The target value of Gamma-value of the displayer corresponding to the preset gray scale according to gray level. And the gray levels may be divided according to the requirements of picture contrast during the adjustment, and also may be divided according to empirical values. For example, set the target value of Gamma-value of the displayer, which is corresponding to the preset gray scale under the gray level 0~10, to 2.4, and set the target value of the displayer, which is corresponding to the preset gray scale under the gray level 11 to 255, to 2.2. Set the target value of the displayer, which is corresponding to the preset gray scale, according to the gray levels may improve the contrast of the picture quality.

According to the present embodiment, setting the target value of the displayer corresponding to the preset gray scale according to the gray levels may improve the contrast of the picture quality.

Figure 5:
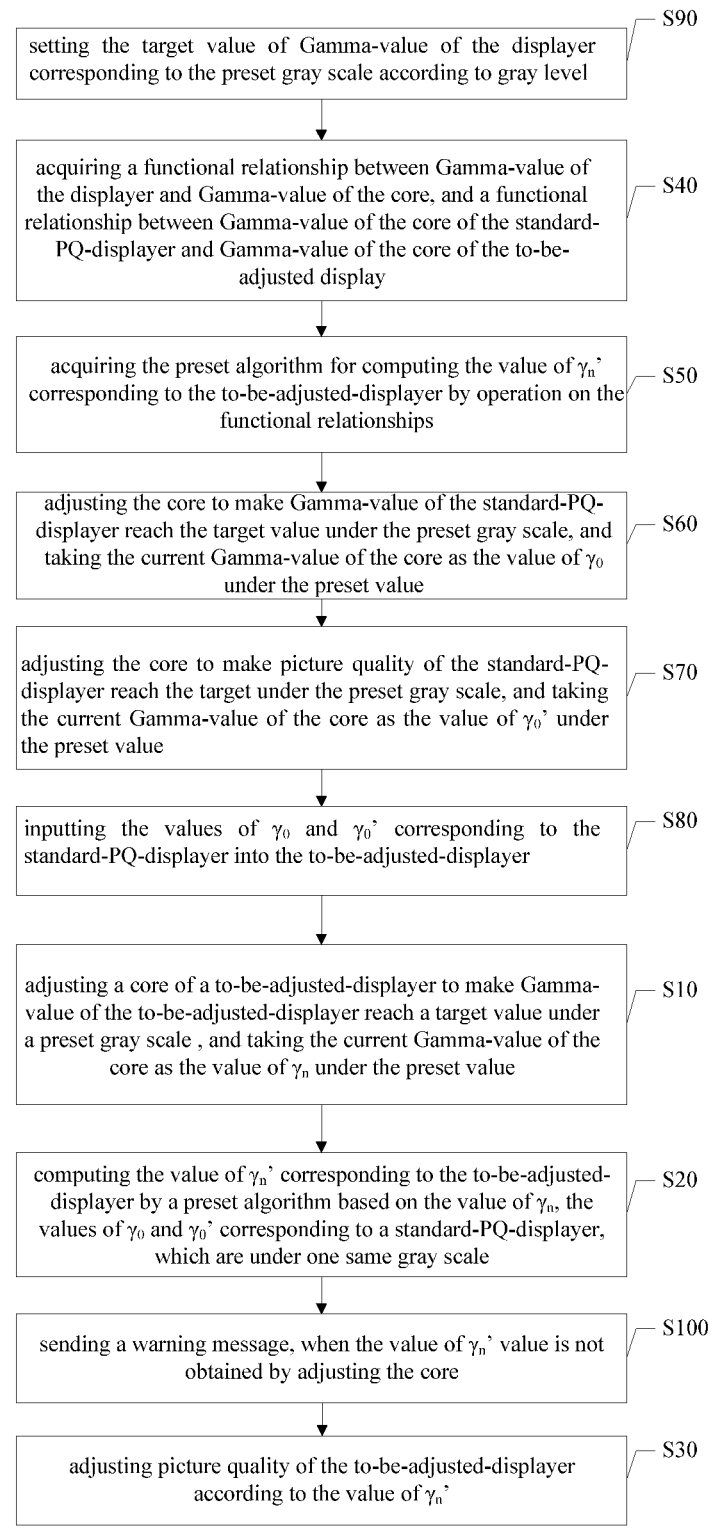
FIG. 5 is a flow chart of a fifth embodiment of the method for adjusting picture quality of displayer according to the present disclosure.

Referring to FIG. 5, FIG. 5 is a flow chart of a fifth embodiment of the method for adjusting picture quality of displayer according to the present disclosure. According to the fourth embodiment of the method for adjusting picture quality of displayer, the method also includes:

S100, sending a warning message, when the value of $\gamma_n'$ value is not obtained by adjusting the core.

Because the value of $\gamma_n'$ is computed according to the preset algorithm, and there exists difference between performance of mass-produced products, when the difference between performance of some displayers and that of the standard-PQ-displayer is smaller, the difference between the computed value of $\gamma_n'$ and the value of $\gamma_n'$ corresponding to the standard-PQ-displayer is also smaller, while the difference is larger for some displayers, and in this case, the difference between the computed value of $\gamma_n'$ and the value of $\gamma_0'$ corresponding to the standard-PQ-displayer is also larger. Gamma-value of core may be adjusted within a range. When the difference between the computed value of $\gamma_n'$ and the value of $\gamma_0'$ corresponding to the standard-PQ-displayer is large (beyond the adjustment range of Gamma-value of core), Gamma-value of the core of the to-be-adjusted-displayer may not necessarily be adjusted to the computed value of $\gamma_n'$. In this case, it may remind in ways such as sending a warning message, so as to determine whether it is necessary to change hardware of the to-be-adjusted-displayer, etc., thereby it is ensured that all displayers may be adjusted to have the target picture quality of the standard-PQ-displayer.

According to the present embodiment, a warning message is sent, when the value of $\gamma_n'$ value is not obtained by adjusting the core, so that the worker may deal with the displayer, thus to ensure that all the displayers may be adjusted to have the target picture quality.

The present disclosure also provides a device for adjusting picture quality of displayer.

Figure 6:
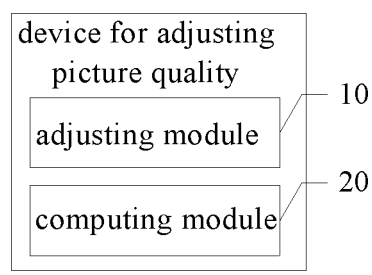
FIG. 6 is a function module diagram of a first embodiment of the device for adjusting picture quality of displayer according to the present disclosure.

Referring to FIG. 6, FIG. 6 is a function module diagram of a first embodiment of the device for adjusting picture quality of displayer according to the present disclosure.

In one embodiment, the method for adjusting picture quality of displayer includes: an adjusting module 10 and a computing module 20.

An adjusting module 10 is configured to adjust a core of a to-be-adjusted-displayer to make Gamma-value of the to-be-adjusted-displayer reach a target value under a preset gray scale, and taking the current Gamma-value of the core as the value of $\gamma_n$ under the preset value; and for displayers, in order to make all picture quality of displayers the same, it is necessary to strictly control components of the displayers in consistency so as to reduce performance difference between the mass-produced displayers, and to adjust the to-be-adjusted-displayers according to a standard-PQ-displayer as standard so as to make all the picture quality of the to-be-adjusted-displayers reach or approximately reach the picture quality of the standard-PQ-displayer. Picture quality of a displayer has been adjusted to the target picture quality, when Gamma-value of the displayer reaches a value that makes the best picture quality. Gamma-value of a displayer includes Gamma-value of the core and Gamma-value of the Timer Controller Register (TCON) of the displayer. And since Gamma-value of TCON is determined by properties of the screen driving plate, that is, Gamma-value of TCON of the displayer is fixed, to adjust picture quality is actually to adjust Gamma-value of the core. Generally speaking, to adjusting picture quality is to adjust different gray scales. Because there commonly divided with 256 different gray scales, Gamma-value of a displayer don't have to be the same when the displayer reaches one target picture quality under different gray scales, that is, Gamma-value of the core don't have to be the same. As it is convenient to measure Gamma-value of a displayer, and same picture quality corresponds to same Gamma-value of the displayers machine, a to-be-adjusted-displayer differs only in Gamma-value of the core in comparison with the standard-PQ-displayer when the to-be-adjusted-displayer reaches the same picture quality with that of the standard-PQ-displayer. And Gamma-value of the core of the standard-PQ-displayer is known when the adjustment is finished, Gamma-value of TCON may be presented in relationship with Gamma-value of the core and/or Gamma-value of the displayer, which means the only one unknown is Gamma-value of the core of the to-be-adjusted display; adjust a core of a to-be-adjusted-displayer to make Gamma-value of the to-be-adjusted-displayer reach a target value under a preset gray scale, and take the corresponding Gamma-value of the core as the value of $\gamma_n$ under the preset value; thereby, excluding the effect caused by inconvenient measurement of Gamma-value of TCON.

A computing module 20 is configured to compute the value of $\gamma_n'$ corresponding to the to-be-adjusted-displayer by a preset algorithm based on the value of $\gamma_n$, the values of $\gamma_0$ and $\gamma_0'$ corresponding to a standard-PQ-displayer, which are under one same gray scale;

As mentioned above, as only Gamma-value of the core of the to-be-adjusted-displayer is unknown, and Gamma-value of the displayer includes Gamma-value of the core and Gamma-value of the TCON, a preset algorithm may be obtained through mathematical operation according to the relationship between Gamma-value of the to-be-adjusted-displayer, Gamma-value of the standard-PQ-displayer, Gamma-value of the cores and the TCONs of the to-be-adjusted-displayer and the standard-PQ-displayer. That is, Gamma-value of the core of the to-be-adjusted-displayer is presented by Gamma-value of the to-be-adjusted-displayer and Gamma-value of the TCON of the to-be-adjusted-displayer, and Gamma-value of the to-be-adjusted-displayer and Gamma-value of the TCON of the to-be-adjusted-displayer may be presented by Gamma-value of the standard-PQ-displayer and Gamma-value of the core of the standard-PQ-displayer. It means that to present Gamma-value of the core of the to-be-adjusted-displayer by Gamma-value of the standard-PQ-displayer and Gamma-value of the core of the standard-PQ-displayer (the preset algorithm), and Gamma-value of the core of the standard-PQ-displayer is known (the values of $\gamma_0$ and $\gamma_0'$), the value of $\gamma_n$ of the to-be-adjusted-displayer may also be obtained by adjustment, therefore the value of $\gamma_n'$ corresponding to the to-be-adjusted-displayer may be computed according to the preset algorithm and the value of $\gamma_0$ is Gamma-value of a core of the standard-PQ-displayer when Gamma-value of the standard-PQ-displayer reaches the target value, the value of $\gamma_0'$ is Gamma-value of the core of the standard-PQ-displayer when picture quality of the standard-PQ-displayer reaches a target, the value of $\gamma_n$ is Gamma-value of the core of the to-be-adjusted-displayer when Gamma-value of the to-be-adjusted-displayer reaches the target value, and the value of $\gamma_n'$ is Gamma-value of the core of the to-be-adjusted-displayer when the picture quality of the to-be-adjusted-displayer reaches the target.

The adjusting module 10 is also configured to adjust picture quality of the to-be-adjusted-displayer according to the value of $\gamma_n'$;

and, the value of $\gamma_0$ is Gamma-value of a core of the standard-PQ-displayer when Gamma-value of the standard-PQ-displayer reaches the target value, the value of $\gamma_0'$ is Gamma-value of the core of the standard-PQ-displayer when picture quality of the standard-PQ-displayer reaches a target, the value of $\gamma_n$ is Gamma-value of the core of the to-be-adjusted-displayer when Gamma-value of the to-be-adjusted-displayer reaches the target value, and the value of $\gamma_n'$ is Gamma-value of the core of the to-be-adjusted-displayer when the picture quality of the to-be-adjusted-displayer reaches the target.

The core of the to-be-adjusted-displayer is adjusted to make Gamma-value of the core be the value of $\gamma_n'$ under the gray scale, so as to realize the adjustment of the picture quality. In this case, Gamma-value of the to-be-adjusted-displayer is the same as that of the standard-PQ-displayer, that is, the picture quality of the to-be-adjusted-displayer is the same as that of the standard-PQ-displayer. Traditional picture quality adjustment method is to directly copy Gamma-value of the core of the standard-PQ-displayer to the to-be-adjusted-displayer. When Gamma-value of the TCON of the standard-PQ-displayer is different from that of the to-be-adjusted-displayer, i.e., when there is performance difference between individual products, Gamma-value of the to-be-adjusted-displayer will be different from that of the standard-PQ-displayer, i.e. the picture quality of the two displayers is different. The picture quality of the displayers is adjusted by adaptively computing all Gamma-value of the core of to-be-adjusted-displayers, so that each to-be-adjusted-displayer may have the same picture quality with that of the standard-PQ-displayer regardless of whether the components of the displayers are in consistency, which is simple and efficient.

According to the present embodiment, the picture quality of the displayers is adjusted by adaptively computing all Gamma-value of the core of to-be-adjusted-displayers, so that each to-be-adjusted-displayer may have the same picture quality with that of the standard-PQ-displayer regardless of whether the components of the displayers are in consistency, which is simple and efficient.

Figure 7:
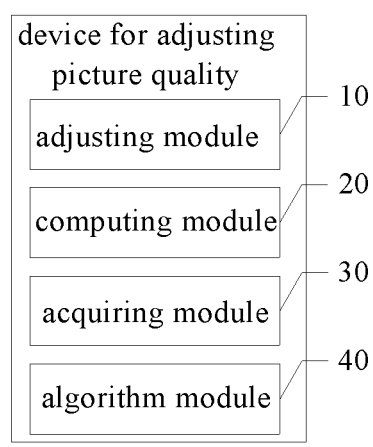
FIG. 7 is a function module diagram of a second embodiment of the device for adjusting picture quality of displayer according to the present disclosure.

Referring to FIG. 7, FIG. 7 is a function module diagram of a second embodiment of the device for adjusting picture quality of displayer according to the present disclosure. The device for adjusting picture quality of displayer also includes an acquiring module 30 and a computing module 40.

The acquiring module 30 is configured to acquire a functional relationship between Gamma-value of the displayer and Gamma-value of the core, and a functional relationship between Gamma-value of the core of the standard-PQ-displayer and Gamma-value of the core of the to-be-adjusted display; and the algorithm module 40, configured to acquire the preset algorithm for computing the value of $\gamma_n'$ corresponding to the to-be-adjusted-displayer by operation on the functional relationships.

A functional relationship between Gamma-value of the displayer and Gamma-value of the core, and a functional relationship between Gamma-value of the core of the standard-PQ-displayer and Gamma-value of the core of the to-be-adjusted display are acquired; and the preset algorithm for computing the value of $\gamma_n'$ corresponding to the to-be-adjusted-displayer is acquired by operation on the functional relationships. In one embodiment, the computing process according to the preset algorithm is as follows, in which the target value of Gamma-value of the displayer is taken as 2.2 as an example for description. Of course, Gamma-value of the displayer may also be any other values; under the gray scale n, Gamma-value of the TCON of the standard-PQ-displayer is recorded as the value of $\gamma_{T0}$, Gamma-value of the core is recorded as the value of $\gamma_0$ when Gamma-value of the displayer is 2.2, and when Gamma-value of the core is the value of $\gamma_0$, the standard-PQ-displayer has the target picture quality, and Gamma-value of the displayer is a; record Gamma-value of the TCON of the to-be-adjusted-displayer as the value of $\gamma_{Tn}$, and when Gamma-value of the displayer reaches 2.2, Gamma-value of its core is the value of $\gamma_n$. When Gamma-value of the to-be-adjusted-displayer is also a, the to-be-adjusted-displayer has the target picture quality same with that of the standard-PQ-displayer, and the corresponding Gamma-value of the core is the value of $\gamma_n'$; the functional relationship between Gamma-value of the displayer and Gamma-value of the core and the TCON is presented as follows:

$$n^\wedge(\gamma_0' \cdot \gamma_{T0}) = n^\wedge a \quad (1)$$

$$n^\wedge(\gamma_0 \cdot \gamma_{T0}) = n^\wedge 2.2 \quad (2)$$

$$n^\wedge(\gamma_n' \cdot \gamma_{Tn}) = n^\wedge a \quad (3)$$

$$n^\wedge(\gamma_n \cdot \gamma_{Tn}) = n^\wedge 2.2 \quad (4)$$

From the above equations (1) and (3), (2) and (4), it may be obtained as follows:

$$n^\wedge(\gamma_0' \cdot \gamma_{T0}) = n^\wedge(\gamma_n' \cdot \gamma_{Tn}) \quad (5)$$

$$n^\wedge(\gamma_0 \cdot \gamma_{T0}) = n^\wedge(\gamma_n \cdot \gamma_{Tn}) \quad (6)$$

That is, $$\gamma_0' \cdot \gamma_{T0} = \gamma_n' \cdot \gamma_{Tn} \quad (7)$$

$$\gamma_0 \cdot \gamma_{T0} = \gamma_n \cdot \gamma_{Tn} \quad (8)$$

From equations (7) and (8), it may be obtained as follows:

$$\gamma_0'/\gamma_0 = \gamma_n'/\gamma_n \quad (9)$$

That is, $$\gamma_n' = \gamma_0' \cdot \gamma_n / \gamma_0 \quad (10)$$

The above formula (10) is the preset algorithm. It may be known from the formula (10) that as long as the values of $\gamma_0$ and $\gamma_0'$ corresponding to the standard-PQ-displayer, and the value of $\gamma_n$ of the to-be-adjusted-displayer, are determined, the value of $\gamma_n'$ corresponding to the to-be-adjusted-displayer is determined. And the value of $\gamma_n'$ is right the Gamma-value of the core to be adjusted to for the picture quality same with that of the standard-PQ-displayer. It is simple to obtain the value of $\gamma_n'$ corresponding to the to-be-adjusted-displayer via the preset algorithm, which corresponds to Gamma-value of the core that makes the to-be-adjusted-displayer gain the same picture quality with that of the standard-PQ-displayer.

In this embodiment, the preset algorithm for computing the value of $\gamma_n'$ corresponding to the to-be-adjusted-displayer is obtained by the functional relationship between Gamma-value of displayer and Gamma-value of core, and the functional relationship between Gamma-value of the core of the standard-PQ-displayer and Gamma-value of the core of the to-be-adjusted-displayer. It is simple to obtain the value of $\gamma_n'$ corresponding to the to-be-adjusted-displayer via the preset algorithm, which corresponds to Gamma-value of the core that makes the to-be-adjusted-displayer gain the same picture quality with that of the standard-PQ-displayer.

Figure 8:
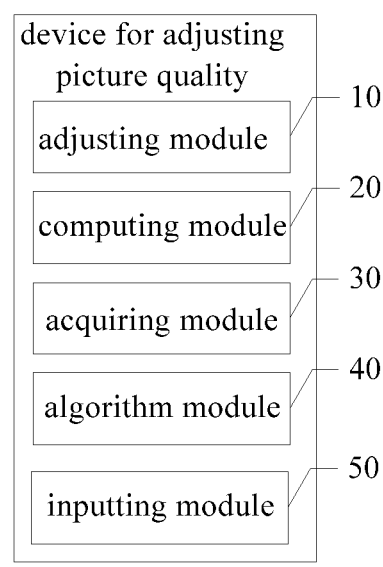
FIG. 8 is a function module diagram of a third embodiment of the device for adjusting picture quality of displayer according to the present disclosure.

Referring to FIG. 8, FIG. 8 is a function module diagram of a third embodiment of the device for adjusting picture quality of displayer according to the present disclosure. The device for adjusting picture quality of displayer also includes an inputting module 50.

The adjusting module 10 is also configured to adjust the core to make Gamma-value of the standard-PQ-displayer reach the target value under the preset gray scale, and to take the corresponding Gamma-value of the core as the value of $\gamma_0$ under the preset value; and adjusting the core to make picture quality of the standard-PQ-displayer reach the target under the preset gray scale, and taking the current Gamma-value of the core as the value of $\gamma_0'$ under the preset value;

the inputting module 50 is configured to input the values of $\gamma_0$ and $\gamma_0'$ corresponding to the standard-PQ-displayer into the to-be-adjusted-displayer.

As mentioned above, to obtain the value of $\gamma_n'$ corresponding to the to-be-adjusted-displayer through the preset algorithm makes it necessary to know the values of $\gamma_0$ and $\gamma_0'$ corresponding to the standard-PQ-displayer, and the value of $\gamma_n$ of the to-be-adjusted-displayer, and the values of $\gamma_0$ and $\gamma_0'$ are obtained by adjusting the standard-PQ-displayer. adjust the core to make Gamma-value of the standard-PQ-displayer reach the target value under the preset gray scale, and taking the current Gamma-value of the core as the value of $\gamma_0$ under the preset value; adjust the core to make picture quality of the standard-PQ-displayer reach the target under the preset gray scale, and taking the current Gamma-value of the core as the value of $\gamma_0'$ under the preset value; Input the values of $\gamma_0$ and $\gamma_0'$ corresponding to the standard-PQ-displayer into the to-be-adjusted-displayer after the values of $\gamma_0$ and $\gamma_0'$ are obtained, then it is only necessary for obtaining the value of $\gamma_n'$ corresponding to the to-be-adjusted-displayer to adjust the to-be-adjusted-displayer so that Gamma-value of the to-be-adjusted-displayer reaches the target value; the values of $\gamma_0$ and $\gamma_0'$ corresponding to the standard-PQ-displayer may be inputted into the to-be-adjusted-displayers in one time, which are produced in one batch, so that picture quality adjustment may be carried out on the batch of the to-be-adjusted-displayers.

According to the embodiment, the values of $\gamma_0$ and $\gamma_0'$ corresponding to the standard-PQ-displayer may be obtained in advance, and then input the values of $\gamma_0$ and $\gamma_0'$ into the to-be-adjusted-displayers, so that the picture quality adjustment may be carried out on the batch of the to-be-adjusted-displayers.

Figure 9:
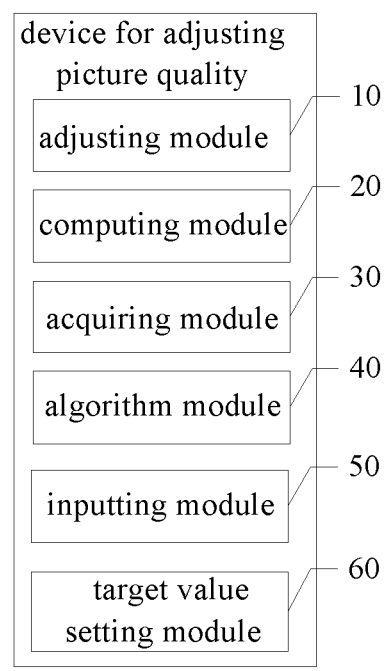
FIG. 9 is a function module diagram of a fourth embodiment of the device for adjusting picture quality of displayer according to the present disclosure.

Referring to FIG. 9, FIG. 9 is a function module diagram of a fourth embodiment of the device for adjusting picture quality of displayer according to the present disclosure. The device for adjusting picture quality of displayer also includes a target value setting module 60.

The target value setting module 60 is configured to set the target value of Gamma-value of the displayer corresponding to the preset gray scale according to the gray level.

According to the present embodiment, setting the target value of the displayer corresponding to the preset gray scale according to the gray levels may improve the contrast of the picture quality.

Figure 10:
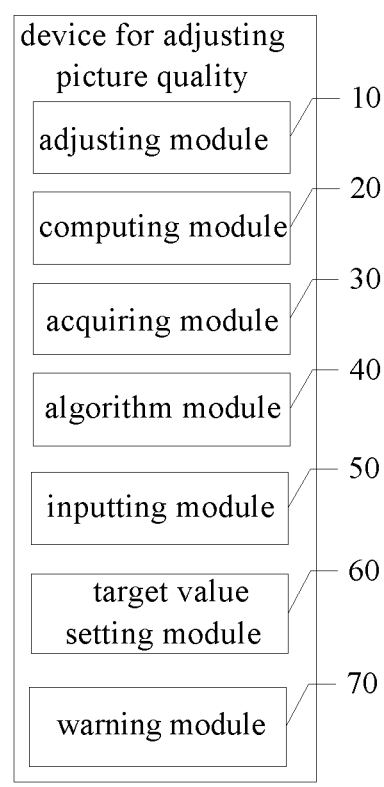
FIG. 10 is a function module diagram of a fifth embodiment of the device for adjusting picture quality of displayer according to the present disclosure.

Referring to FIG. 10, FIG. 10 is a function module diagram of a fifth embodiment of the device for adjusting picture quality of displayer according to the present disclosure. The device for adjusting picture quality of displayer also includes a warning module 70.

The warning module 70 is configured to send a warning message, when the value of $\gamma_n'$ is not obtained by adjusting the core.

According to the present embodiment, a warning message is sent, when the value of $\gamma_n'$ value is not obtained by adjusting the core, so that the worker may deal with the displayer, thus to ensure that all the displayers may be adjusted to have the target picture quality.

The above is only the preferred embodiment of the present disclosure and is not therefore limiting the scope of the patent of the present disclosure. Any equivalent structure or equivalent process change made by using the contents of the present specification and drawings, or directly or indirectly applied in other related technical fields, is similarly included in the scope of the patent protection of the present disclosure.

What is claimed is:

1. A method for adjusting picture quality of displayer, comprising:

adjusting a core of a to-be-adjusted-displayer to make Gamma-value of the to-be-adjusted-displayer reach a target value under a preset gray scale, and taking the current Gamma-value of the core as the value of $\gamma_n$ under the preset gray value;

computing the value of $\gamma_n'$ corresponding to the to-be-adjusted-displayer by a preset algorithm based on the value of $\gamma_n$, and the values of $\gamma_0$ and $\gamma_0'$ corresponding to a standard-PQ-displayer under one same gray scale; and adjusting picture quality of the to-be-adjusted-displayer according to the value of $\gamma_n'$;

wherein, the value of $\gamma_0$ is the Gamma-value of a core of the standard-PQ-displayer when the Gamma-value of the standard-PQ-displayer reaches the target value, the value of $\gamma_0'$ is the Gamma-value of the core of the standard-PQ-displayer when picture quality of the standard-PQ-displayer reaches the target value, the value of $\gamma_n$ is the Gamma-value of the core of the to-be-adjusted-displayer when the Gamma-value of the to-be-adjusted-displayer reaches the target value, and the value of $\gamma_n'$ is the Gamma-value of the core of the to-be-adjusted-displayer when the picture quality of the to-be-adjusted-displayer reaches the target value.

2. The method according to claim 1, wherein the method further comprises:

acquiring a functional relationship between the Gamma-value of the displayer and the Gamma-value of the core, and a functional relationship between the Gamma-value of the core of the standard-PQ-displayer and the Gamma-value of the core of the to-be-adjusted-displayer; and acquiring the preset algorithm for computing the value of $\gamma_n'$ corresponding to the to-be-adjusted-displayer by operation to the functional relationships.

3. The method according to claim 2, wherein the functional relationship between the Gamma-value of the displayer and the Gamma-value of the core is:

Gamma-values of the displayer comprising Gamma-value of the core and Gamma-value of a Timer Control Register, the functional relationship between Gamma-value of the displayer and, Gamma-value of the core and Gamma-value of the Timer Control Register being represented as follows:

$n^{\wedge}(\gamma_0 \cdot \gamma_{T0}) = n^{\wedge}a$, for the standard-PQ-displayer, when Gamma-value of the displayer is the target value a; and $n^{\wedge}(\gamma_n \cdot \gamma_{Tn}) = n^{\wedge}a$, for the to-be-adjusted-displayer, when Gamma-value of the displayer is the target value a;

wherein, Gamma-value of the Timer Control Register is determined by a screen driving plate and is a fixed value; the value of $\gamma_{T0}$ is the Gamma-value of the Timer Control Register of the standard-PQ-displayer; the value of $\gamma_{Tn}$ is the Gamma-value of the Timer Control Register of the to-be-adjusted-displayer.

4. The method according to claim 2, wherein the preset algorithm is $\gamma_n' = \gamma_0' \cdot \gamma_n / \gamma_0$.

5. The method according to claim 1, wherein before the operation of adjusting a core of a to-be-adjusted-displayer to make Gamma-value of the to-be-adjusted-displayer reach a target value under a preset gray scale, and taking the current Gamma-value of the core as the value of $\gamma_n$ under the preset gray value, the method further comprises:

adjusting the core to make the Gamma-value of the standard-PQ-displayer reach the target value under the preset gray scale, and taking the current Gamma-value of the core as the value of $\gamma_0$ under the preset gray value;

adjusting the core to make picture quality of the standard-PQ-displayer reach the target value under the preset gray scale, and taking the current Gamma-value of the core as the value of $\gamma_0'$ under the preset gray value;

inputting the values of $\gamma_0$ and $\gamma_0'$ corresponding to the standard-PQ-displayer into the to-be-adjusted-displayer.

6. The method according to claim 5, wherein the method further comprises:

setting the target value of the Gamma-value of the displayer corresponding to the preset gray scale according to gray level.

7. The method according to claim 6, wherein the operation of setting the target value of the Gamma-value of the displayer corresponding to the preset gray scale according to gray level comprises:

setting the target value of the Gamma-value of the displayer corresponding to a gray scale of a lower gray level greater than or equal to the target value of the Gamma-value of the displayer corresponding to a gray scale of a higher gray level.

8. The method according to claim 1, wherein the method further comprises:

sending a warning message, when the value of $\gamma_n'$ is not obtained by adjusting the core.

9. A device for adjusting picture quality, comprising a processor and a memory, wherein the processor executes instructions stored in the memory to implement:

an adjusting module, configured to adjust a core of a to-be-adjusted-displayer to make Gamma-value of the to-be-adjusted-displayer reach a target value under a preset gray scale, and taking the current Gamma-value of the core as the value of $\gamma_n$ under the preset gray value; and a computing module, configured to compute the value of $\gamma_n'$ corresponding to the to-be-adjusted-displayer by a preset algorithm based on the value of $\gamma_n$, the values of $\gamma_0$ and $\gamma_0'$-corresponding to a standard-PQ-displayer, which are under one same gray scale;

the adjusting module being further configured to adjust picture quality of the to-be-adjusted-displayer according to the value of $\gamma_n'$;

wherein, the value of $\gamma_0$ is the Gamma-value of a core of the standard-PQ-displayer when the Gamma-value of the standard-PQ-displayer reaches the target value, the value of $\gamma_0'$ is the Gamma-value of the core of the standard-PQ-displayer when picture quality of the standard-PQ-displayer reaches the target value, the value of $\gamma_n$ is the Gamma-value of the core of the to-be-adjusted-displayer when the Gamma-value of the to-be-adjusted-displayer reaches the target value, and the value of $\gamma_n'$ is the Gamma-value of the core of the to-be-adjusted-displayer when the picture quality of the to-be-adjusted-displayer reaches the target value.

10. The device according to claim 9, wherein the processor executes instructions stored in the memory to further implement:
an acquiring module, configured to acquire a functional relationship between Gamma-value of the displayer and Gamma-value of the core, and a functional relationship between Gamma-value of the core of the standard-PQ-displayer and Gamma-value of the core of the to-be-adjusted-displayer; and
an algorithm module, configured to acquire the preset algorithm for computing the value of $\gamma_n'$ corresponding to the to-be-adjusted-displayer by operation to the functional relationships.

11. The device according to claim 10, wherein the functional relationship between Gamma-value of the displayer and Gamma-value of the core is:
Gamma-value of the displayer comprising Gamma-value of the core and Gamma-value of a Timer Control Register, the functional relationship between Gamma-value of the displayer and, Gamma-value of the core and Gamma-value of the Timer Control Register being represented as follows:
$n\hat{}(\gamma_0 \cdot \gamma_{T0}) = n\hat{}a$, for the standard-PQ-displayer, when Gamma-value of the displayer is the target value a; and
$n\hat{}(\gamma_n \cdot \gamma_{Tn}) = n\hat{}a$, for the to-be-adjusted-displayer, when Gamma-value of the displayer is the target value a;
wherein, Gamma-value of the Timer Control Register is determined by a screen driving plate and is a fixed value; the value of $\gamma_{T0}$ is Gamma-value of the Timer Control Register of the standard-PQ-displayer; the value of $\gamma_{Tn}$ is Gamma-value of the Timer Control Register of the to-be-adjusted-displayer.

12. The device according to claim 10, wherein the preset algorithm is $\gamma_n' = \gamma_0' \cdot \gamma_n / \gamma_0$.

13. The device according to claim 9, wherein the processor executes instructions stored in the memory to further implement an inputting module;
the adjusting module is further configured to adjust the core to make Gamma-value of the standard-PQ-displayer reach the target value under the preset gray scale, and to take the current Gamma-value of the core as the value of $\gamma_0$ under the preset gray value; and
adjusting the core to make picture quality of the standard-PQ-displayer reach the target value under the preset gray scale, and taking the current Gamma-value of the core as the value of $\gamma_0'$ under the preset gray value;
the inputting module is configured to input the values of $\gamma_0$ and $\gamma_0'$ corresponding to the standard-PQ-displayer into the to-be-adjusted-displayer.

14. The device according to claim 13, wherein the processor executes instructions stored in the memory to further implement:
a target value setting module, configured to set the target value of Gamma-value of the displayer corresponding to the preset gray scale according to gray level.

15. The device according to claim 14, wherein the target value setting module is further configured to set the target value of Gamma-value of the displayer corresponding to a gray scale of a lower gray level greater than or equal to the target value of Gamma-value of the displayer corresponding to a gray scale of a higher gray level.

16. The device according to claim 9, wherein the processor executes instructions stored in the memory to further implement:
a warning module, configured to send a warning message, when the value of $\gamma_n'$ is not obtained by adjusting the core.

* * * * *